Feb. 1, 1938. P. M. FREER 2,107,241
PACKING RING
Filed Jan. 11, 1937

INVENTOR
PHELPS M. FREER
ATTORNEYS

Patented Feb. 1, 1938

2,107,241

UNITED STATES PATENT OFFICE 2,107,241

PACKING RING

Phelps M. Freer, Detroit, Mich.

Application January 11, 1937, Serial No. 120,095

3 Claims. (Cl. 309—33)

The invention relates to packing rings and refers more particularly to rings for use with pistons of internal combustion engines.

The invention has for some of its objects to provide a flexible packing ring which will effectively follow the cylinder wall and which is adapted to receive a pressure medium as it leaks between the cylinder wall and the body carrying the ring; and to provide a packing ring having an inner portion including a wall extending generally axially of the body, the inner portion having a width greater than that of the groove in the body and constructed to more firmly contact with the groove walls when the inner portion is subjected to a pressure medium. The invention has for another object to provide a packing ring which may be economically formed and which is of relatively light weight and a portion of which has a sliding fit in the groove of the body to minimize relative movement of the ring and body during reciprocation of the latter. The invention has for a further object to provide a construction of packing ring which will minimize the wear upon the body.

Figure 1:
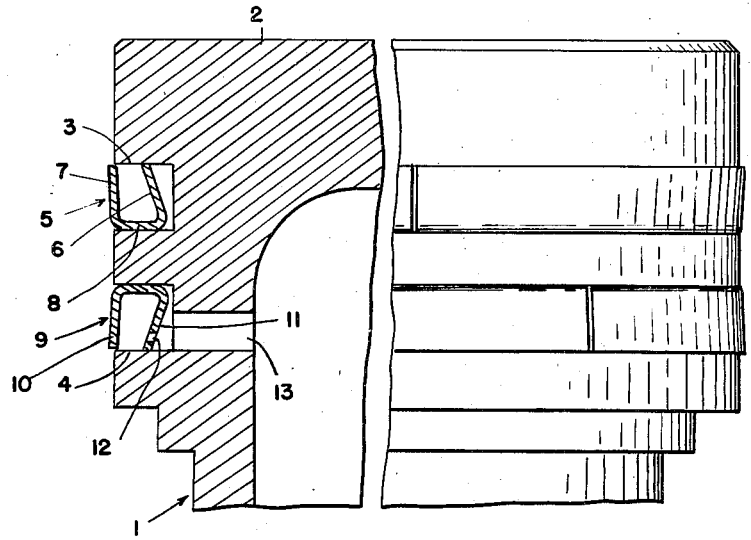
Figures 2, 3, 4:
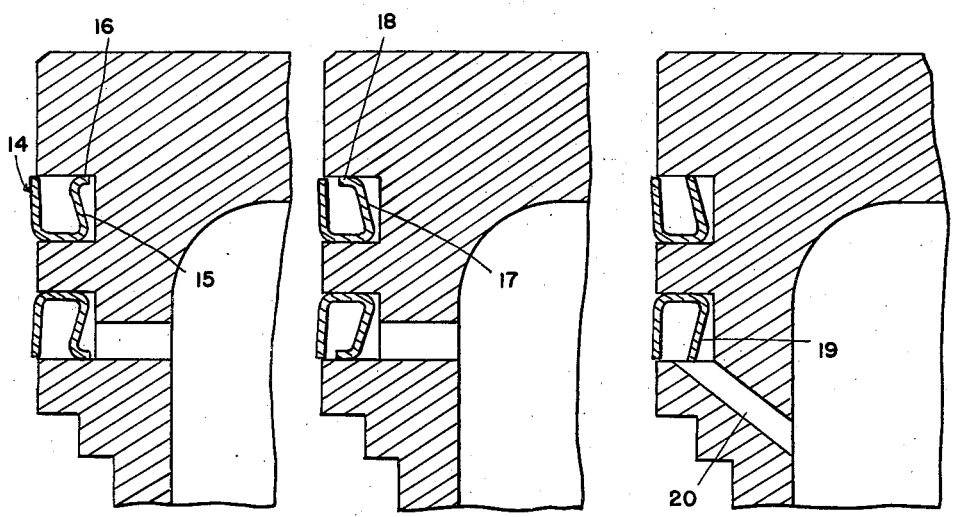

These and other objects of the invention will become apparent from the following description, taken in connection with the accompanying drawing, in which Figure 1 is a sectional elevation of a portion of a packing ring showing an embodiment of my invention;

Figures 2, 3 and 4 are similar views showing modifications.

While my invention is particularly applicable to packing rings for pistons of internal combustion engines, it is also applicable to packing rings for pistons of compressors, pumps and the like.

As illustrated in Figure 1, I is the body of the piston of an internal combustion engine having the head 2, which forms the pressure end. The head is provided with the annular grooves 3 and 4, the former being located nearer the pressure end. Both of these grooves have a rectangular sectional area which, as shown, is substantially square.

5 is the packing ring located in the groove 3. The ring is preferably formed of spring metal of relatively light gauge and it is transversely split at one point so that it is sufficiently flexible to follow the cylinder wall when out of round. The ring is of general U-shaped section and has the inner and outer walls 6 and 7 respectively, which are substantially concentric and also substantially coaxial with the body. An intermediate wall 8 connects corresponding edges of the inner and outer walls. Both the inner and outer walls are adapted to flex about their junction with the intermediate wall and the outer wall is preferably slightly flared from the intermediate wall outwardly and toward the pressure end of the body. The inner wall has a width normally greater than that of the groove and it is flared from the intermediate wall outwardly toward the pressure end of the body and toward the outer wall. The relative widths of the groove and the inner and outer walls of the ring are such that the inner portion of the ring, including the inner wall, has a sliding fit with the groove, while the outer portion, including the outer wall, has standard clearance. The standard clearance, for example, where a packing ring having a width of one-eighth inch is used, is .0025 inch to .003 inch. The sliding fit is, of course, much less and in the present instance is preferably such that the inner portion of the ring engages both the upper and lower walls of the groove.

The ring 5 opens upwardly so that it will receive a pressure medium which may leak past the head of the piston body and the cylinder wall. The pressure medium within the ring functions to force the outer wall outwardly into more effective sealing contact with the cylinder wall and also functions to force the inner wall inwardly so that its free upper edge more firmly engages the upper wall of the groove to prevent the escape of the pressure medium into the portion of the groove inwardly beyond the inner wall. By reason of the sliding fit, reciprocation of the piston body causes corresponding movement of the packing ring and prevents relative axial movement and consequent wear of either the packing ring or the body. However, the packing ring is free to slide radially of the body to take care of variation in the cylinder wall. Furthermore, inasmuch as the ring is formed of sheet metal of relatively light gauge, the weight is such that the momentum of the ring is much less than if the ring were formed of other materials, such as cast metal, and were made solid.

9 is the ring located in the groove 4. This ring is essentially formed in the same manner as the flexible ring 5, but it is reversed so that it opens downwardly whereby the outer wall 10 serves to scrape the lubricating oil off the cylinder wall and to deflect the oil into the ring. The inner wall 11 of the ring is formed with the openings 12 therethrough to provide for escape of the oil from the interior of the ring into the oil passages 13 formed in the body.

Figure 2 discloses another modification of packing ring which, in general, is the same as the packing ring 5. This packing ring 14 has at the free upper edge of its inner wall 15 the transverse inwardly turned flange 16 which provides an area of contact with the upper wall of the groove of greater extent than that provided by the upper edge alone of the inner wall.

The construction of packing ring illustrated in Figure 3 also provides an extended area of contact with the upper wall of the groove, but in this case the upper free edge of the inner wall 17 of the ring is provided with the outwardly turned flange 18 for engaging the upper wall of the groove.

In the construction illustrated in Figure 4, the parts have the same general arrangement as shown in Figure 1, with the exception that the inner wall of the oil collecting ring 19 is not formed with openings, but is imperforate. Flow of the oil from the interior of this ring is provided by the inclined oil passages 20 formed in the piston body and leading downwardly and inwardly from the interior of the ring.

What I claim as my invention is:

1. The combination with a piston body having an annular groove, of a flexible packing ring within said groove having inner and outer walls and a portion connecting the same, said inner wall having a width greater than that of said groove and being flared toward said outer wall and radially spaced from the bottom of said groove and also being adapted to flex when subjected to pressure of a medium leaking into the ring to seal the portion of said groove inwardly beyond said inner wall.

2. The combination with a piston body having an annular groove, of a flexible packing ring within said groove having substantially concentric inner and outer walls substantially coaxial with said body, said walls being flexible and having free edges at one end of said ring, said inner wall being radially spaced from the bottom of said groove and having a width greater than that of said groove and being flared with its free edge portion inclined toward said outer wall.

3. The combination with a piston body having an annular groove, of a flexible sheet metal packing ring within said groove having a generally U-shaped section with the inner wall of the U flared from the bottom wall of the U toward the outer wall thereof and of a width greater than that of said groove and normally having a sliding fit in the groove, the inner wall being radially spaced from the bottom of said groove and being adapted to flex to bring its free edge into more firm contact with the associated groove wall when subjected to pressure of a medium leaking into said ring.

PHELPS M. FREER.